US010845685B2

(12) United States Patent
Aruga et al.

(10) Patent No.: US 10,845,685 B2
(45) Date of Patent: Nov. 24, 2020

(54) LIGHT SOURCE DEVICE AND PROJECTOR

(71) Applicant: SEIKO EPSON CORPORATION, Tokyo (JP)

(72) Inventors: Shin Aruga, Azumino (JP); Masato Kadotani, Matsumoto (JP); Kazuya Usuda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 86 days.

(21) Appl. No.: 16/255,961

(22) Filed: Jan. 24, 2019

(65) Prior Publication Data

US 2019/0227415 A1    Jul. 25, 2019

(30) Foreign Application Priority Data

Jan. 25, 2018 (JP) ................. 2018-010295

(51) Int. Cl.
 G03B 21/16 (2006.01)
(52) U.S. Cl.
 CPC .................... G03B 21/16 (2013.01)
(58) Field of Classification Search
 CPC .... G03B 21/006; G03B 21/008; G03B 21/16; G03B 21/145; G03B 21/2013; G03B 21/2033
 See application file for complete search history.

(56) References Cited

U.S. PATENT DOCUMENTS

| 10,108,075 B2* | 10/2018 | Nomoto | G03B 21/16 |
|---|---|---|---|
| 2011/0179806 A1* | 7/2011 | Ipposhi | F28D 15/0266 62/3.3 |
| 2011/0194578 A1* | 8/2011 | Hirose | H04N 9/3129 372/36 |
| 2015/0355533 A1* | 12/2015 | Masuda | H01S 5/02469 353/52 |
| 2018/0173084 A1* | 6/2018 | Kikuchi | G03B 21/204 |
| 2018/0180974 A1* | 6/2018 | Imaoka | F28D 15/06 |

FOREIGN PATENT DOCUMENTS

| JP | 2015-040870 A | 3/2015 |
|---|---|---|
| JP | 2017-138471 A | 8/2017 |

* cited by examiner

*Primary Examiner* — Sultan Chowdhury
(74) *Attorney, Agent, or Firm* — Oliff PLC

(57) ABSTRACT

A light source device has a light source unit including a base member and a plurality of light emitting devices held in the base member, a heat receiving plate including an opening portion, to which the base member is fixed to cover the opening portion, and a heat diffusion member in contact with the base member via the opening portion. Heat from the light source unit is transmitted to the heat receiving plate and the heat diffusion member.

10 Claims, 5 Drawing Sheets

LIGHT SOURCE DEVICE AND PROJECTOR

BACKGROUND

1. Technical Field

The present invention relates to a light source device and projector using the light source device as a light source.

2. Related Art

A light source device used as a light source for a projector is disclosed in Patent Document 1 (JP-A-2017-138471). A light source unit of the light source device of Patent Document 1 includes a base member, a plurality of light emitting devices held in a matrix form in the base member, and a collimator lens that parallelizes the emitted lights from the respective light emitting devices. The respective light emitting devices are semiconductor lasers.

When the light source unit is operated, the light emitting devices emit lights and generate heat. Here, if the temperatures of the light emitting devices change, light output from the light source unit may fluctuate. To address the problem, a light source device disclosed in Patent Document 2 (JP-A-2015-40870) includes a cooling mechanism for cooling the light source unit. The cooling mechanism of Patent Document 2 includes a heat receiving plate in contact with the base member of the light source unit, and a heat pipe fixed to an opposite surface to the base member in the heat receiving plate. The heat from the light source unit is transmitted to the heat receiving plate, further transmitted to the heat pipe, and released.

In the cooling mechanism for cooling the light source unit, it is required that the heat generated in the light source unit is released from the light source unit to outside more efficiently.

SUMMARY

An advantage of some aspects of the invention is to provide a light source device that easily release heat from a light source unit. Another advantage of some aspects of the invention is to provide a projector including the light source device.

A light source device according to an aspect of the invention includes a light source unit including a base member and a plurality of light emitting devices held in the base member, a heat receiving plate including an opening portion, to which the base member is fixed to cover the opening portion, and a heat diffusion member including at least a part in contact with the base member inside of the opening portion, wherein heat from the light source unit is transmitted to the heat receiving plate and the heat diffusion member.

According to the aspect of the invention, the heat receiving plate and the heat diffusion member are in contact with the base member of the light source unit. Therefore, the heat generated in the light source unit is transmitted from the base member to the heat receiving plate and released from the heat receiving plate. Further, the heat generated in the light source unit is transmitted from the base member to the heat diffusion member and released from the heat diffusion member. Thus, the heat generated in the light source unit is easily released to outside.

In the aspect of the invention, the heat receiving plate may include a first surface and a second surface facing an opposite side to the first surface, the base member may be fixed to the first surface, and the heat diffusion member may be placed on a side of the second surface. According to the configuration, the heat diffusion member may have a larger shape than the opening portion of the heat receiving plate. With this configuration, the heat diffusion member may diffuse the heat from the base member in a wider area.

In the aspect of the invention, the heat diffusion member may include a first contact portion in contact with the base member and a second contact portion in contact with the heat receiving plate. According to the configuration, the heat transmitted from the light source unit to the heat receiving plate is released from the heat receiving plate, and further transmitted from the heat receiving plate to the heat diffusion member and released from the heat diffusion member.

In the aspect of the invention, it is desirable that the light source device has a heat dissipation fin fixed to the heat diffusion member. According to the configuration, the heat transmitted to the heat diffusion member is diffused by the heat diffusion member and transmitted to the heat dissipation fin and released from the heat dissipation fin to the outside.

In the aspect of the invention, it is desirable that, in the heat diffusion member, the part in contact with the base member has higher thermal conductivity than thermal conductivity of the heat receiving plate. According to the configuration, the heat generated in the light source unit is easily transmitted to the heat diffusion member.

In the aspect of the invention, the heat receiving plate may be made of an aluminum alloy, and, in the heat diffusion member, the part in contact with the base member may be made of copper. According to the configuration, the thermal conductivity part in contact with the base member in the heat diffusion member may be made higher than the thermal conductivity of the heat receiving plate. Further, according to the configuration, the strength of the heat receiving plate in the heat diffusion member may be easily made higher than the strength of the part in contact with the base member. Therefore, the heat receiving plate may have the strength that bears the fixation of the light source unit.

In the aspect of the invention, the heat diffusion member may include a vapor chamber having a copper container with a chamber and a working fluid enclosed in the chamber, and the container may be in contact with the base member. According to the configuration, the heat of the light source unit may be transmitted from the base member to the vapor chamber and efficiently diffused and released in the vapor chamber.

A projector according to an aspect of the invention includes the above described light source device as a light source.

According to the aspect of the invention, in the light source device, the heat from the light source unit is easily released. Therefore, in the projector, a high-temperature condition of the light source unit of the light source device may be prevented or suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, a light source device and projector as embodiments of the invention will be explained with reference to the drawings.

Projector

Figure 1:
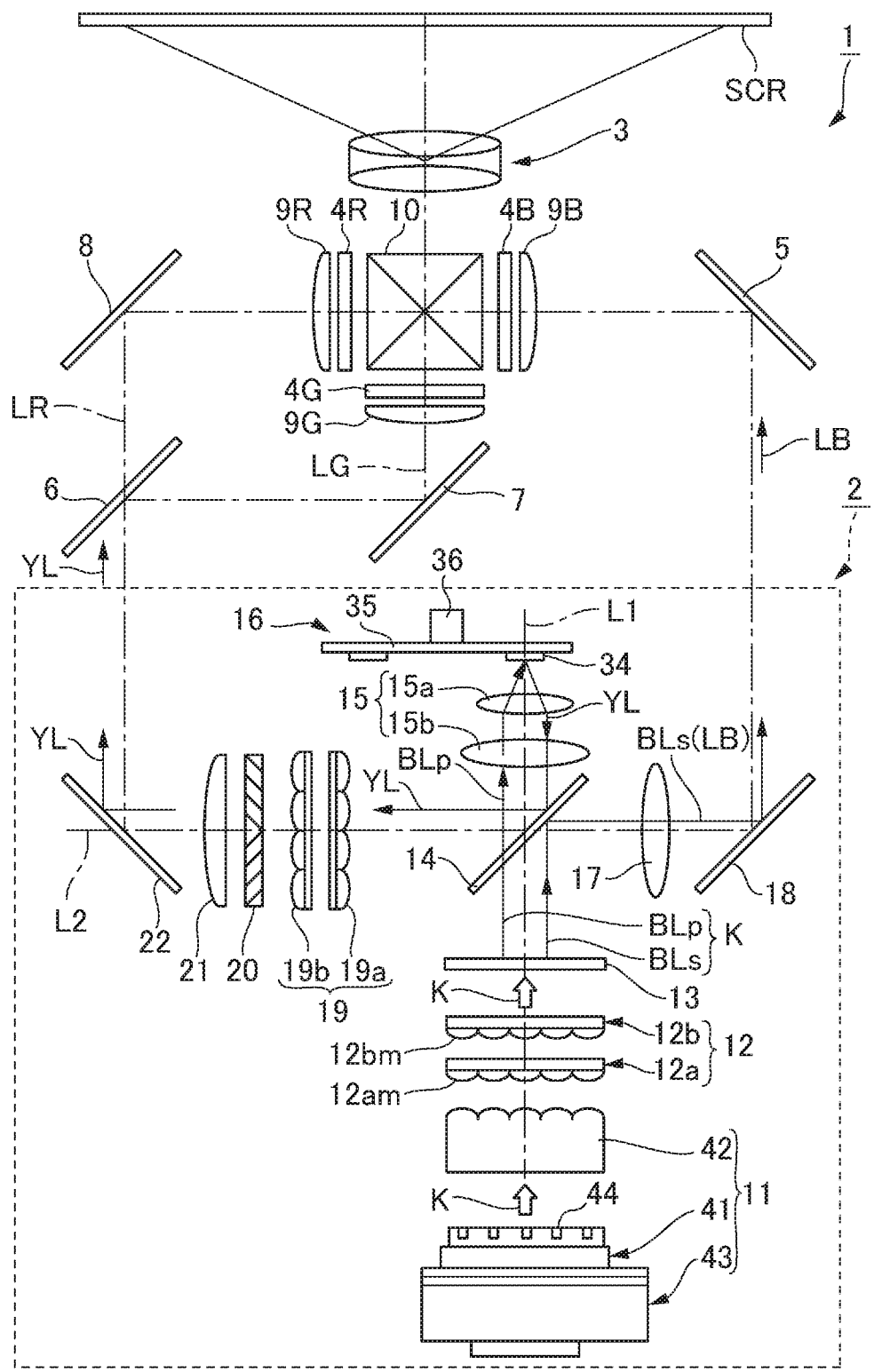
FIG. 1 is a schematic configuration diagram of a projector to which the invention is applied.

FIG. 1 is a schematic configuration diagram of a projector 1 to which the invention is applied. As shown in FIG. 1, the projector 1 includes an illumination apparatus 2, a projection system 3, a first reflection mirror 5, a dichroic mirror 6, a second reflection mirror 7, a third reflection mirror 8, a light modulation device 4R, a light modulation device 4G, a light modulation device 4B, and a light combining system 10.

The illumination apparatus 2 includes a light source device 11, a first optical integration system 12, a wave plate 13, a polarization separation element 14, a pickup system 15, a fluorescence emitting device 16. Further, the illumination apparatus 2 includes a blue light superimposing lens 17, and a reflection mirror 18. Furthermore, the illumination apparatus 2 includes a second optical integration system 19, a polarization separation element 20, a yellow light superimposing lens 21, and a reflection mirror 22.

The light source device 11 includes a light source unit 41 that emits blue light, a collimator lens 42, and a cooling mechanism 43 for cooling the light source unit 41. The light source unit 41 includes a plurality of light emitting devices 44. A pencil of light K output from the light source unit 41 is parallelized by the collimator lens 42. The details of the light source device 11 will be described later. Note that, in the following description, the optical axis of the light source unit 41 is referred to as "optical axis L1". Further, the optical axis within the same plane as the optical axis L1 and orthogonal to the optical axis L1 is referred to as "optical axis L2".

The pencil of light K enters the first optical integration system 12. The first optical integration system 12 includes a first lens array 12a and a second lens array 12b. The respective lenses of the first lens array 12a and the respective lenses of the second lens array 12b correspond to each other. Here, the first lens array 12a and the fluorescence emitting device 16 on the optical axis L1 of the first lens array 12a are optically conjugate with each other. Further, the first lens array 12a and the light modulation device 4B are optically conjugate with each other. Furthermore, the light-exiting surfaces of the light emitting devices 44 and the second lens array 12b are optically conjugate with each other.

The first optical integration system 12 homogenizes the illuminance distribution (brightness) of light radiating the fluorescence emitting device 16 with the pickup system 15. Further, the first optical integration system 12 homogenizes the illuminance distribution of light in an image formation area of the light modulation device 4B with the blue light superimposing lens 17.

The pencil of light K transmitted through the first optical integration system 12 enters the wave plate 13. The wave plate 13 is a half wave plate. The rotation angle of the half wave plate is appropriately set, and thereby, the pencil of light K transmitted through the wave plate 13 may be light containing an S-polarized component and a P-polarized component for the polarization separation element 14 at a predetermined ratio.

The polarization separation element 14 is placed at angles of 45° respectively relative to the optical axis L1 and the optical axis L2. The polarization separation element 14 separates the pencil of light K passing through the wave plate 13 into the S-polarized component and the P-polarized component. Further, the polarization separation element 14 reflects light in a wavelength range different from that of the blue pencil of light K, i.e., yellow light YL of fluorescent light, which will be described later, regardless of the polarization state thereof.

Specifically, the polarization separation element 14 reflects a beam BLs of the S-polarized component of the incident light (pencil of light K) and transmits a beam BLp of the P-polarized component of the incident light. The beam BLs as the S-polarized component is reflected by the polarization separation element 14 and travels toward the blue light superimposing lens 17. The beam BLp as the P-polarized component is transmitted through the polarization separation element 14 and travels toward the fluorescence emitting device 16.

The S-polarized beam BLs output from the polarization separation element 14 enters the blue light superimposing lens 17. The blue light superimposing lens 17 superimposes the beam BLs on the image formation area of the light modulation device 4B with the first optical integration system 12, and thereby, homogenizes the illuminance distribution of blue light LB. The blue light BLs transmitted through the blue light superimposing lens 17 enters the light modulation device 4B via the reflection mirror 18, the first reflection mirror 5, and a field lens 9B.

On the other hand, the beam BLp as the P-polarized component is transmitted through the polarization separation element 14 and enters the pickup system 15. The pickup system 15 has a function of collecting the beam BLp onto a fluorescent layer 34 of the fluorescence emitting device 16 and a function of picking up and parallelizing the fluorescence output from the fluorescent layer 34. The pickup system 15 includes e.g. a pickup lens 15a and a pickup lens 15b. The pickup system 15 superimposes the beam BLp on the fluorescent layer 34 of the fluorescence emitting device 16 with the first optical integration system 12.

The fluorescence emitting device 16 includes the fluorescent layer 34, a substrate 35 that supports the fluorescent layer 34, and a driver 36. The substrate 35 is a circular plate rotatable about a rotation shaft by the driver 36. The substrate 35 is formed using a metal having a good heat dissipation property such as e.g. aluminum or copper. The fluorescent layer 34 is provided along the circumferential direction of the substrate 35 on one surface of the substrate 35. The driver 36 includes a drive source such as a motor.

The fluorescent layer 34 contains fluorescent particles that absorb and convert the blue beam BLp into yellow light YL of fluorescence and output the light. As the fluorescent particles, e.g. a YAG (yttrium aluminum garnet) fluorescent material is used. As the fluorescent layer 34, a fluorescent layer formed by dispersion of fluorescent particles in an inorganic binder of alumna or the like or a fluorescent layer formed by sintering of the fluorescent particles without using the binder is used.

A reflection part (not shown) is provided on the opposite side to the side into which the beam BLp of the fluorescent layer 34 enters. The reflection part reflects the yellow light YL generated in the fluorescent layer 34 toward the side of the pickup system 15.

The yellow light YL output from the fluorescent layer 34 is converted into parallel light by the pickup system 15. The yellow light YL output from the pickup system 15 is reflected by the polarization separation element 14 and enters the second optical integration system 19.

The second optical integration system 19 homogenizes the illuminance distribution by the yellow light YL in the illuminated area with the yellow light superimposing lens 21. The second optical integration system 19 includes a first lens array 19a and a second lens array 19b.

The yellow light YL passing through the second optical integration system 19 enters the polarization separation element 20. The polarization separation element 20 includes e.g. a polarization separation layer and a wave plate. The polarization separation element 20 converts the yellow light YL into linearly-polarized light.

The yellow light YL passing through the polarization separation element 20 enters the yellow light superimposing lens 21. The yellow light superimposing lens 21 superimposes the yellow light YL output from the polarization separation element 20 onto the image formation area of the light modulation device 4R for red light and green light as the illuminated area. The second optical integration system 19 and the yellow light superimposing lens 21 homogenize the illuminance distribution in the illuminated area.

Here, the dichroic mirror 6 is placed in the optical path of the yellow light YL. The dichroic mirror 6 separates the yellow light YL output from the illumination apparatus 2 into red light LR and green light LG. That is, the dichroic mirror 6 transmits the red light LR and reflects the green light LG.

The second reflection mirror 7 is placed in the optical path of the green light LG. The second reflection mirror 7 reflects the green light LG separated by the dichroic mirror 6 toward the light modulation device 4G. The green light LG is reflected by the dichroic mirror 6 and the second reflection mirror 7, and then, illuminates the image formation area of the light modulation device 4G for green light via a field lens 9G.

The third reflection mirror 8 is placed in the optical path of the red light LR. The third reflection mirror 8 reflects the red light LR separated by the dichroic mirror 6 toward the light modulation device 4R. The red light LR is transmitted through the dichroic mirror 6, and illuminates the image formation area of the light modulation device 4R for red light via the third reflection mirror 8 and a field lens 9R.

The light modulation device 4R modulates the red light LR according to image information during passing of the red light LR, and forms image light corresponding to the red light LR. The light modulation device 4G modulates the green light LG according to the image information during passing of the green light LG, and forms image light corresponding to the green light LG. The light modulation device 4B modulates the blue light LB according to the image information during passing of the blue light LB, and forms image light corresponding to the blue light LB.

For the light modulation device 4R, the light modulation device 4G, and the light modulation device 4B, e.g. transmissive liquid crystal panels are used. A pair of polarizers (not shown) are placed on the light-incident side and the light-exiting side of the liquid crystal panel. The field lens 9R, the field lens 9G, and the field lens 9B are placed on the light-incident sides of the light modulation device 4R, the light modulation device 4G, and the light modulation device 4B, respectively.

The light combining system 10 combines the respective image lights corresponding to the red light LR, the green light LG, and the blue light LB and outputs the combined image light toward the projection system 3. For the light combining system 10, e.g. a cross dichroic prism is used.

The projection system 3 includes a plurality of projection lenses. The projection system 3 enlarges and projects the image light combined by the light combining system 10 toward a screen SCR. Thereby, an enlarged color picture is displayed on the screen SCR.

Light Source Device

Figure 2:
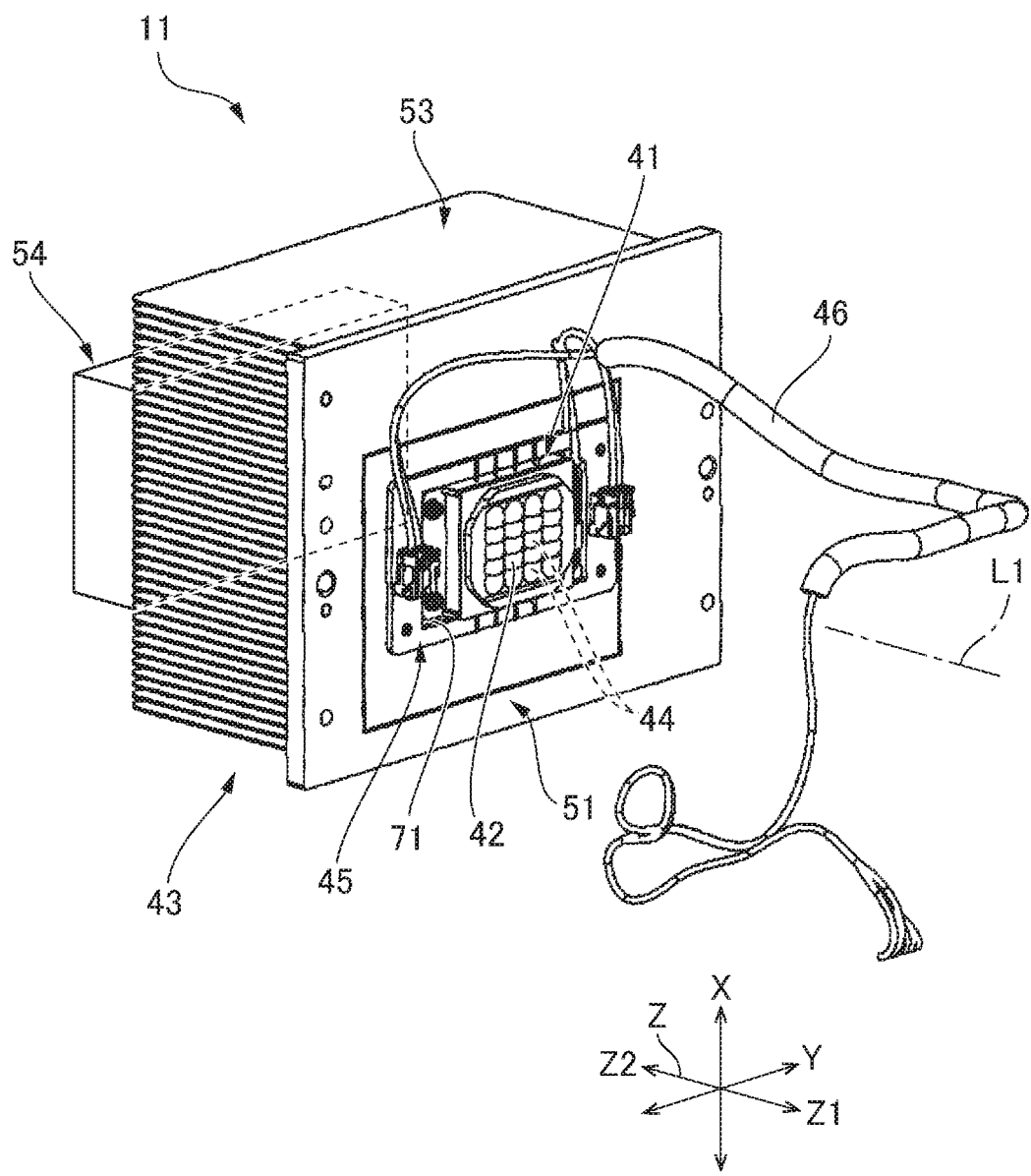
FIG. 2 is a perspective view of a light source device to which the invention is applied.
Figure 3:
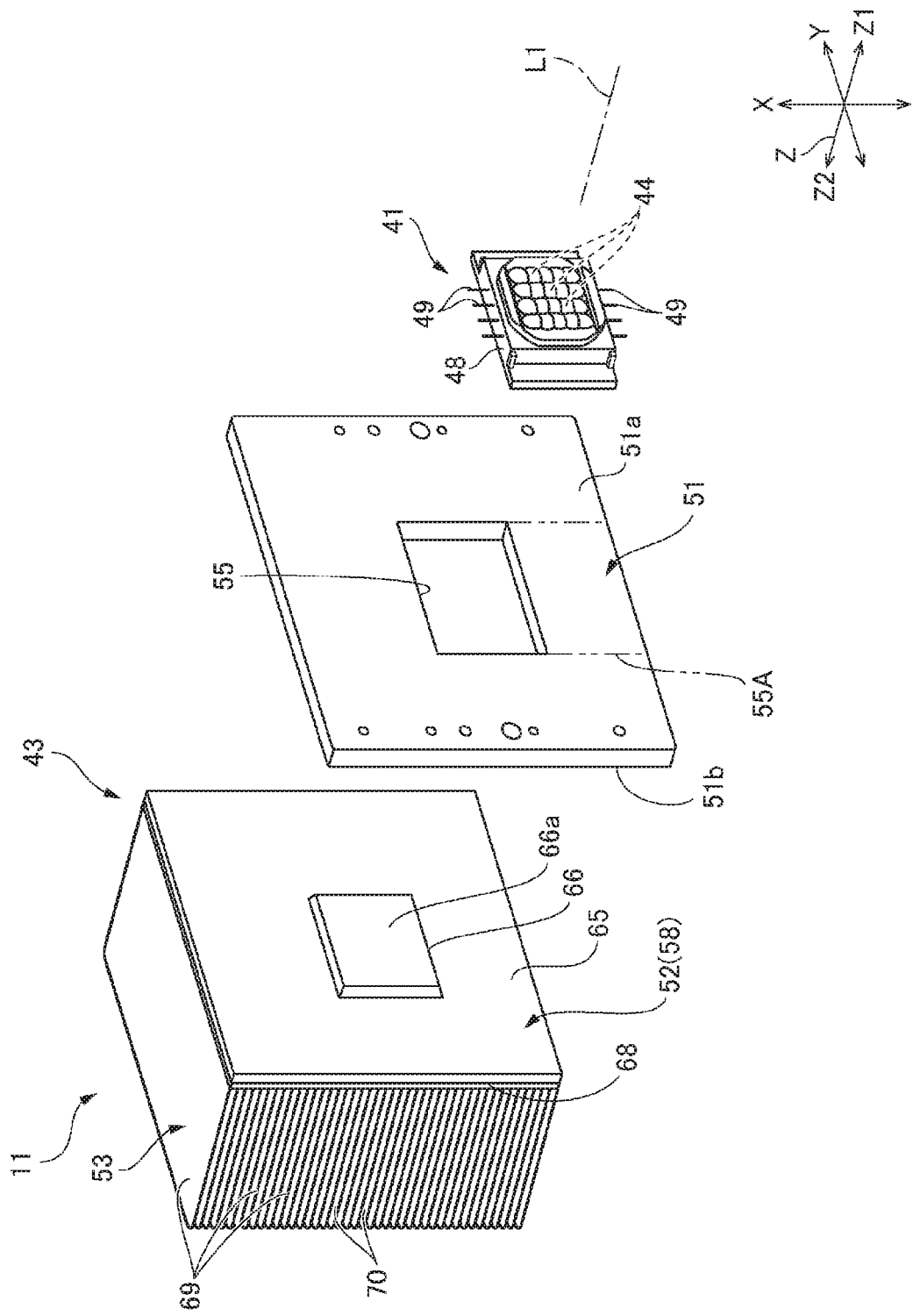
FIG. 3 is an exploded perspective view of the light source device.
Figure 4:
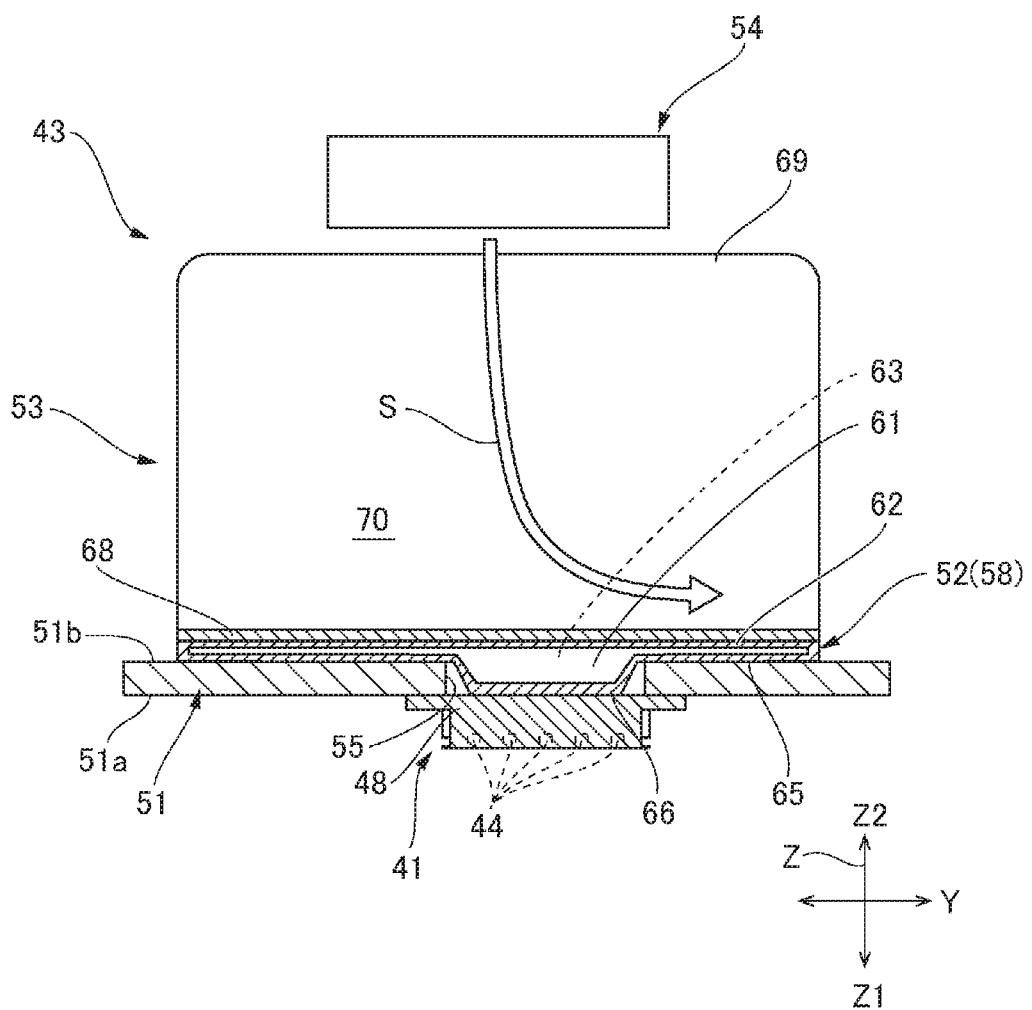
FIG. 4 is a sectional view of the light source device.
Figure 5:
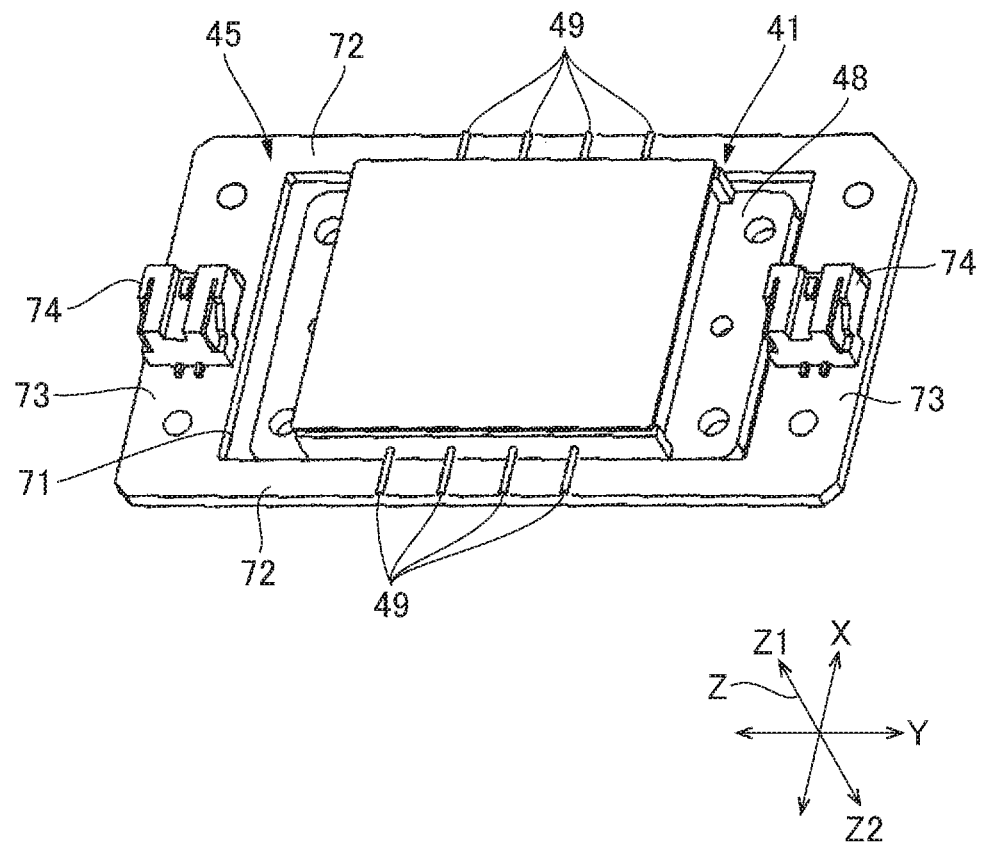
FIG. 5 is a perspective view of a circuit board and a light source unit.

FIG. 2 is a perspective view of the light source device 11. FIG. 3 is an exploded perspective view of the light source device 11. In FIG. 3, a cooling fan of the cooling mechanism, a circuit board, and a power supply cable are not shown. FIG. 4 is a sectional view of the light source device. FIG. 5 is a perspective view of the circuit board on which the light source unit 41 is mounted. As shown in FIG. 2, the light source device 11 includes the light source unit 41, the collimator lens 42, the cooling mechanism 43, a circuit board 45, and a power supply cable 46.

As shown in FIG. 3, the light source unit 41 includes a base member 48 having a rectangular planar shape and the plurality of light emitting devices 44 placed in a matrix form and held in the base member 48. The base member 48 is made of a metal such as e.g. aluminum or copper. The respective light emitting devices 44 are semiconductor lasers. The respective light emitting devices 44 emit blue lights BL in the same exiting direction as one another. Further, the light source unit 41 includes a plurality of terminals 49 projecting toward outside from respective two sides opposed in the lateral direction of the base member 48. The plurality of terminals 49 are terminals for power supply to the plurality of light emitting devices 44. Four of the terminals project from the respective sides. The light source unit 41 is packaged.

The collimator lens 42 is fixed to the base member 48. The collimator lens 42 is located at the downstream in the emission direction in which the respective light emitting devices 44 emit the blue lights BL. The bundle of the plurality of lights BL (pencil of light K) emitted from the plurality of light emitting devices 44 are parallelized by the collimator lens 42.

Note that, in the following explanation of the light source device 11, three directions orthogonal to one another are referred to as "X-direction", "Y-direction", and "Z-direction". The Z-directions are directions along the optical axis L1 of the pencil of light K output from the light source device 11, in which the light source unit 41 and the collimator lens 42 are arranged. Further, the direction from the light source unit 41 toward the collimator lens 42 in the Z-directions is referred to as "Z1-direction", and the opposite direction is referred to as "Z2-direction". In the base member, the directions in which the two sides with the terminals 49 projecting therefrom are opposed (the lateral directions of the base member 48) are the X-directions and the directions in which the other two sides are opposed (the longitudinal directions of the base member 48) are the Y-directions. The plurality of terminals 49 project from the base member 48 in the X-directions.

As shown in FIG. 4, the cooling mechanism 43 includes a heat receiving plate 51 stacked in the Z2-direction of the light source unit 41, a heat diffusion member 52 stacked in the Z2-direction of the heat receiving plate 51 (on the opposite side to the light source unit 41), a heat dissipation fin 53 stacked in the Z2-direction of the heat diffusion member 52, and a cooling fan 54 placed in the Z2-direction of the heat diffusion member 52.

The heat receiving plate 51 is a metallic plate-like member having a fixed thickness. In the example, the heat receiving plate 51 is made of an aluminum alloy. As shown in FIG. 3, the heat receiving plate 51 includes a first surface 51a facing in the Z1-direction (the side of the light source unit 41) and a second surface 51b facing in the Z2-direction. Further, the heat receiving plate 51 includes an opening portion 55 in the center part. In the example, the opening portion 55 has a rectangular shape. The light source unit 41 is fixed to the first surface 51a of the heat receiving plate 51 to close the opening portion 55. More specifically, the base member 48 of the light source unit 41 is fixed to the side of the first surface 51a of the heat receiving plate 51 by screws. As seen from the Z-directions, the opening portion 55 is located inside of the rectangular outline of the base member 48. Therefore, the opening portion 55 is covered by the base member 48.

The heat receiving plate 51 and the base member 48 are in surface contact. Here, the thermal conductivity of the heat receiving plate 51, i.e., the thermal conductivity of the aluminum alloy is e.g. 135 W/mk (aluminum alloy of JIS A5052) or 209 W/mk (aluminum alloy of JIS A6063).

The heat diffusion member 52 is a vapor chamber 58. As shown in FIG. 4, the vapor chamber 58 has a container 62 including a decompression chamber 61 and a working fluid 63 of pure water or the like enclosed in the chamber 61.

As shown in FIG. 3, the container 62 has a flat shape thinner in the Z-directions. The container 62 is made of copper and includes a main body portion 65 (second contact portion) in a flat rectangular parallelepiped shape and a rectangular projecting portion 66 (first contact portion) projecting in the Z1-direction from the center of the main body portion 65. The projecting portion 66 has a size that can be inserted into the opening portion 55 of the heat receiving plate 51, and the projection dimension of the projecting portion 66 corresponds to the thickness dimension of the heat receiving plate 51. Here, the thermal conductivity of the vapor chamber 58 in contact with the base member 48 is 3000 W/mk higher than the thermal conductivity of the heat receiving plate 51.

As shown in FIG. 4, the vapor chamber 58 is stacked on the heat receiving plate 51 with the projecting portion 66 inserted into the opening portion 55 of the heat receiving plate 51 from the Z2-direction and with the main body portion 65 in contact with the second surface 51b of the heat receiving plate 51. The main body portion 65 is fixed to the second surface 51b of the heat receiving plate 51 by brazing or soldering. The heat receiving plate 51 and the main body portion 65 are in surface contact. Further, an end surface 66a of the projecting portion 66 is in surface contact with the base member 48 inside of the opening portion 55. Here, when the projecting portion 66 is inserted into the opening portion 55 of the heat receiving plate 51, thermal grease is injected into the opening portion 55. Therefore, the projecting portion 66 and the base member 48 are in contact with the thermal grease in between. As described above, of the heat diffusion member 52, the first contact portion is in contact with the base member 48 and the second contact portion is in contact with the heat receiving plate 51.

The heat dissipation fin 53 includes a rectangular heat dissipation plate 68 fixed to the container 62 of the vapor chamber 58, and a plurality of fins 69 stood from the heat dissipation plate 68 in the Z2-direction. The plurality of fins 69 are arranged in parallel to one another in the X-directions. Predetermined gaps 70 are provided between the adjacent fins 69. The heat dissipation plate 68 is fixed to the container 62 of the vapor chamber 58 by brazing or soldering. The container 62 of the vapor chamber 58 and the heat dissipation plate 68 are in surface contact.

The cooling fan 54 is placed in a position opposed to the respective fins 69 of the heat dissipation fin 53 from the opposite side to the heat dissipation plate 68. The cooling fan 54 generates an air flow from the end side of the fins 69 toward the heat dissipation plate 68. The air flow S generated by the cooling fan 54 flows in the gaps 70 between the adjacent fins 69 toward the heat dissipation plate 68 and flows along the heat dissipation plate 68, and go outside in the Y-directions from between the adjacent fins 69.

The circuit board 45 includes a power supply circuit that supplies power to the light source unit 41. As shown in FIG. 2, the circuit board 45 has a rectangular frame shape and includes a rectangular board opening portion 71 at the center. More specifically, as shown in FIG. 5, the circuit board 45 includes a pair of long-side board portions 72 opposed with a gap in the X-directions and a pair of short-side board portions 73 respectively connecting both ends of the long-side board portions 72 in the Y-directions. The board opening portion 71 is comparted by the pair of long-side board portions 72 and the pair of short-side board portions 73.

The light source unit 41 has a main body part (a part except the terminals 49 of the light source unit 41) located inside of the board opening portion 71. The plurality of terminals 49 of the light source unit 41 are respectively mounted on the pair of long-side board portions 72 and electrically connected to the power supply circuit. Thereby, the light source unit 41 is mounted on the circuit board 45. Connectors 74 are mounted on the respective pair of short-side board portions 73. The power supply cable 46 is connected to the connectors 74. In the power supply cable 46, the opposite end to the connectors 74 is connected to a power supply device of the projector 1. The circuit board 45 is fixed to the heat receiving plate 51 by screws.

Here, the light source device 11 is fixed to the frame or the like of the projector 1 with the heat receiving plate 51. That is, the heat receiving plate 51 also functions as a fixing member for fixing the light source device 11 to the frame or the like of the projector 1.

Cooling of Light Source Unit by Cooling Mechanism

When power is supplied to the light source unit 41 via the power supply cable 46, the plurality of light emitting devices 44 emit lights. Thereby, the pencil of light K is output from the light source device 11. Further, in the light source device 11, the cooling fan 54 is driven in parallel to the power supply to the light source unit 41. Thereby, the air flow S is generated.

When the light emitting devices 44 emit lights, the light source unit 41 generates heat. The heat generated in the light source unit 41 is transmitted from the base member 48 to the heat receiving plate 51 and released from the heat receiving plate 51. Further, the heat generated in the light source unit 41 is transmitted from the heat receiving plate 51 to the vapor chamber 58 and diffused in the vapor chamber 58. Furthermore, the heat generated in the light source unit 41 is transmitted directly from the base member 48 to the vapor chamber 58 and diffused in the vapor chamber 58.

Then, the heat diffused in the vapor chamber 58 is transmitted to the heat dissipation fin 53 and released from the heat dissipation fin 53. Further, the heat diffused in the vapor chamber 58 is also released from the vapor chamber 58. Here, the air flow S from the cooling fan 54 circulates in the gaps 70 between the respective fins 69 of the heat dissipation fin 53, and thereby, the heat diffused by the vapor chamber 58 and transmitted to the heat dissipation fin 53 is efficiently released from the respective fins 69 to the outside.

Note that, in the vapor chamber 58, the working fluid 63 is heated in the projecting portion 66 in contact with the base member 48 and the part of the main body portion 65 on the side of the light source unit 41 in contact with the heat receiving plate 51. The working fluid 63 is heated and evaporated, and the vapor is diffused within the chamber 61. Then, when the vapor reaches the part on the side in contact with the heat dissipation fin 53 in the main body portion 65, the vapor is cooled and returned to a liquid. Here, a wick structure that generates a capillary force is provided within the chamber 61, and the working fluid 63 returned to the liquid moves to the side of the light source unit 41 by the capillary action. Thereby, the working fluid 63 repeats the cycle of absorbing heat and evaporating. Therefore, the vapor chamber 58 may diffuse the heat generated in the light source unit 41 in a wider area.

Advantages

In the example, the light source device 11 may release the heat generated in the light source unit 41 via the heat receiving plate 51 and the heat diffusion member 52 (vapor chamber 58). Therefore, the heat generated in the light source unit 41 may be easily released to the outside.

Further, in the example, the vapor chamber 58 includes the main body portion 65 placed on the side of the second surface 51b of the heat receiving plate 51 and the projecting portion 66 inserted into the opening portion 55 of the heat receiving plate 51 and being in contact with the light source unit 41. Thereby, the vapor chamber 58 may have the larger shape than the opening portion 55 of the heat receiving plate 51. Therefore, the vapor chamber 58 may diffuse the heat transmitted from the light source unit 41 in a wider area.

The thermal conductivity of the vapor chamber 58 in contact with the base member 48 is higher than the thermal conductivity of the heat receiving plate 51. Therefore, in the example, the heat generated in the light source unit 41 may be easily transmitted to the vapor chamber 58 and may efficiently be diffused and released via the vapor chamber 58.

Here, according to the cooling mechanism 43 of the example, it has been confirmed that heat dissipation performance is improved by about 10% compared to the case where a configuration in which the opening portion 55 is not provided in the heat receiving plate 51 and the flat vapor chamber 58 without the projecting portion 66 is stacked on the second surface 51b of the heat receiving plate 51 (a configuration without contact between the vapor chamber 58 and the base member 48) is employed.

In the example, the heat receiving plate 51 is made of the aluminum alloy and has a higher strength than the part in contact with the base member 48 (the container 62 of the vapor chamber 58) in the heat diffusion member 52. Therefore, the heat receiving plate 51 may have the strength that bears the fixation of the light source unit 41. In other words, the container 62 of the vapor chamber 58 is made of copper and includes the chamber 61 (cavity portion) inside, and has a lower strength than the heat receiving plate 51. Therefore, when the light source unit 41 is fixed to the vapor chamber 58, the vapor chamber 58 may be deformed. On the other hand, in the example, the light source unit 41 is fixed to the heat receiving plate 51, and deformation of the member to which the light source unit 41 is fixed may be avoided.

Further, in the projector 1 of the example, in the light source device 11 as the light source, the heat from the light source unit 41 is easily released. Therefore, in the projector 1, the high-temperature condition of the light source unit 41 of the light source device 11 may be prevented or suppressed. Thus, fluctuations of light output from the light source unit 41 due to fluctuations of the temperatures of the light emitting devices 44 may be prevented or suppressed.

Other Embodiments

As the heat diffusion member 52, a heat pump may be employed in place of the vapor chamber 58. Also, in this case, the heat pump is brought into contact with the base member 48 of the light source unit 41 via the opening portion 55 of the heat receiving plate 51.

Or, as the heat diffusion member 52, a copper plate member may be employed. Also, in this case, it is assumed that the copper plate member includes a projecting portion and the projecting portion is brought into contact with the base member 48 via the opening portion 55 of the heat receiving plate 51. Here, the thermal conductivity of copper is 391 W/mk (copper of JIS C1100) and higher than the thermal conductivity of the heat receiving plate 51. Therefore, according to the configuration, the heat from the light source unit 41 may be diffused and released by the heat diffusion member 52.

Note that the opening portion 55 of the heat receiving plate 51 may be a cutout portion provided by cutting out of the edge of the heat receiving plate 51 toward the center part. For example, the opening portion may be e.g. a cutout portion 55A shown by dashed-two dotted lines in FIG. 3. In this case, the light source unit 41 is fixed to the heat receiving plate 51 to partially cover the cutout portion 55A. Further, the heat diffusion member 52 stacked on the side of the second surface 51b of the heat receiving plate 51 is brought into contact with the base member 48 of the light source unit 41 via the cutout portion 55A.

The entire disclosure of Japanese Patent Application No. 2018-010295, filed on Jan. 25, 2018 is expressly incorporated by reference herein.

What is claimed is:

1. A light source device comprising:
    a light source unit including a base member and a plurality of light emitting devices held within the base member;
    a heat receiving plate including an opening portion, to which the base member is fixed to cover the opening portion; and
    a heat diffusion member including at least a part in contact with the base member inside of the opening portion,
    wherein the heat receiving plate includes a first surface and a second surface facing an opposite side to the first surface,
    the base member is fixed to the first surface,
    the heat diffusion member is placed on a side of the second surface, and includes a first contact portion in contact with the base member inside of the opening portion and a second contact portion in contact with the second surface of the heat receiving plate, and
    heat from the light source unit is transmitted to the heat receiving plate and the heat diffusion member.

2. The light source device according to claim 1, further comprising a heat dissipation fin fixed to the heat diffusion member.

3. A projector comprising the light source device according to claim 1 as a light source.

4. A projector comprising the light source device according to claim 2 as a light source.

5. A light source device comprising:
    a light source unit includes a base member and a plurality of light emitting devices held in the base member;

a heat receiving plate including an opening portion, to which the base member is fixed to cover the opening portion; and a heat diffusion member including at least a part in contact with the base member inside of the opening portion, wherein heat from the light source unit is transmitted to the heat receiving plate and the heat diffusion member, and in the heat diffusion member, the part in contact with the base member has higher thermal conductivity than thermal conductivity of the heat receiving plate.

6. The light source device according to claim 5, wherein the heat receiving plate is made of an aluminum alloy, and in the heat diffusion member, the part in contact with the base member is made of copper.

7. A projector comprising the light source device according to claim 6 as a light source.

8. The light source device according to claim 5, wherein the heat diffusion member is a vapor chamber having a copper container with a chamber and a working fluid enclosed in the chamber, and the container is in contact with the base member.

9. A projector comprising the light source device according to claim 8 as a light source.

10. A projector comprising the light source device according to claim 5 as a light source.

* * * * *